United States Patent [19]

Henkel et al.

[11] 3,915,125

[45] Oct. 28, 1975

[54] METHOD FOR THE OPERATION OF INTERNAL-COMBUSTION ENGINES AND GAS REFORMER FOR IMPLEMENTING THE METHOD

[75] Inventors: Hans-Joachim Henkel; Christian Koch; Alfred Michel; Richard Schnarz, all of Erlangen; Hana Kostka, Grossgrundlach, all of Germany

[73] Assignee: Siemens Aktiengesellschaft, Munich, Germany

[22] Filed: Feb. 6, 1974

[21] Appl. No.: 440,023

Related U.S. Application Data

[63] Continuation-in-part of Ser. No. 270,923, June 12, 1973, abandoned.

[30] Foreign Application Priority Data

July 16, 1971  Germany............................ 2135650

[52] U.S. Cl.................................. 123/3; 123/119 A
[51] Int. Cl.²......................................... F02C 43/08
[58] Field of Search.......... 123/3, 119 A, 119 E, 34, 123/133, 1 A

[56] References Cited
UNITED STATES PATENTS

| | | | |
|---|---|---|---|
| 2,201,965 | 5/1940 | Cook | 123/3 |
| 3,059,422 | 10/1962 | White | 123/133 |
| 3,116,988 | 1/1964 | Lauder | 123/34 |
| 3,447,511 | 6/1969 | Beard et al. | 123/133 |
| 3,635,200 | 1/1972 | Rundell et al. | 123/3 |
| 3,709,203 | 1/1973 | Cettin et al. | 123/119 A |
| 3,828,736 | 8/1974 | Koch | 123/119 A |

*Primary Examiner*—Wendell E. Burns
*Assistant Examiner*—David D. Reynolds
*Attorney, Agent, or Firm*—Kenyon & Kenyon Reilly Carr & Chapin

[57] ABSTRACT

Method and apparatus for the operation of a gas reformer in conjunction with an internal-combustion engine for the purpose of reducing the pollution of the exhaust gases in which a mixture of fuel and primary air and/or exhaust gas is converted into soot-free reformed gas in the gas reformer in the presence of a catalyst; the reformed gas and secondary air are then supplied to the internal-combustion engine may be recirculated through the gas reformer. From start-up to warm-up to operation under load, fuel is mixed with a decreasing percentage of slightly understochiometric supply of primary air. For operation under load, the primary air is largely replaced by exhaust gas which heats up the mixture fed to the catalyst in the gas reformer. During operation under load, reformed gas is generated as needed by the internal-combustion engine by supplying fuel, exhaust gas and primary air in accordance with the temperature of the catalyst.

23 Claims, 3 Drawing Figures

METHOD FOR THE OPERATION OF INTERNAL-COMBUSTION ENGINES AND GAS REFORMER FOR IMPLEMENTING THE METHOD

Related Applications

This application is a continuation-in-part of application Ser. No. 270,923 filed June 12, 1973 and now abandoned.

BACKGROUND OF THE INVENTION

1. Field of the Invention

This invention relates to a method and apparatus for the operation of internal-combustion engines for the purpose of reducing the pollution of exhaust gases. In particular, this invention relates to a gas reformer apparatus and to a method for operating this gas reformer apparatus in conjunction with internal-combustion engines, such as those used in automobiles, for the purpose of achieving decontamination of the exhaust gases.

2. Description of the Prior Art

Known methods and known apparatus have already been proposed for the operation of internal-combustion engines for the purpose of producing low-pollution exhaust gases. German Pat. No. 844,373 discloses a gas reformer which is intended for use in motor vehicles. The gas reformer of German Pat. No. 844,373 operates with expensive external heating of the reaction chamber which requires part of the reformed gas to be fed in through pipe lines. But German Pat. No. 844,373 lacks any arrangement to allow feedback of the exhaust gas. In addition, a vibration-sensitive piling is used as the catalyst carrier which represents a large flow resistance and has a tendency to abrasion.

German Pat. No. 720,535 discloses a gas reformer which provides for exhaust gas feedback. In German Pat. No. 720,535, tubes in a heavy tank are solidly lined with a metallic catalyst. Such a tank is also used as the catalyst carrier in the gas reformer device of German Pat. No. 739,518. German Pat. No. 739,518 also suggests that methane and carbon monoxide can be produced as the reformed gas.

The methods and apparatus of the foregoing patents do not produce exhaust gases which are sufficiently low in pollution.

SUMMARY OF THE INVENTION

The object of this invention is to improve known methods and apparatus which use gas reformers. The method and apparatus of this invention are designed to provide a supply of reformed gas for use during the cold condition when the internal-combustion engine has just been started, during the warm-up condition, during the condition of full load on the engine and during the condition when the load on the engine is changing.

During the starting and the warm-up of the internal-combustion engine, fuel and slightly understochiometric primary air, relative to complete combustion, are supplied to the reformer chamber of a gas reformer and ignited. The slightly understochiometric supply of primary air is maintained until the starting temperature of the catalyst is reached. After the starting temperature of the catalyst is reached, the proportion of primary air is reduced relative to the proportion of fuel until the reforming temperature of the fuel-exhaust gas mixture is reached. Reducing the proportion of primary air has the effect of increasing the proportion of fuel.

After the reforming temperature has been reached and for the transition to operation of the internal-combustion engine under load, the primary air is replaced with exhaust gas and part of the fuel is also replaced with exhaust gas, thereby producing a thermal exchange with the mixture fed to the catalyst and producing a rise in the catalyst temperature to a predetermined operating temperature of the catalyst. During the transition to operation under load from the point of reaching the reforming temperature, the primary air can be largely replaced by exhaust gas. The change over from acceleration through starting and warm-up to operation under load means a change from an exothermic process to an endothermic process, as far as possible.

The gas reformer apparatus of this invention consists of a reformer chamber which is connected by pipeline to the internal-combustion engine; a fuel metering device which supplies a mixture of fuel and primary air, or fuel and exhaust gas or fuel and a combination of primary air and exhaust gas, to the reformer chamber; a pipeline for recirculating part of the exhaust gas from the internal-combustion engine through the fuel metering device and then into the reformer chamber; and a control unit for operating these components. There are also valves and pipelines for the supply of primary air, secondary air and fuel. The reformer chamber has one or more perforated sintered blocks which act as carriers for the catalyst material, a temperature sensor, two heat exchangers and an ignition device. There is also a control throttle load valve for controlling the power output of the internal-combustion engine.

The method according to this invention allows the gas reformer apparatus to be brought from the cold condition to the rated operational condition without having to tolerate much overshoot. During operation under load, the operating temperature of the catalyst can be kept within narrow limits. The primary air can, therefore, be replaced almost completely by exhaust gas, which means economical and fuel-saving operation. The method according to the invention is therefore equally suited for engines with continuous as well as discontinuous internal combustion.

Among the fuels which are suited for use with the method of this invention are aliphatic, straight-chain hydrocarbons of short chain lengths, i.e., those having low octane number, such as $c_7H_{16}$. The addition of anti-knock agents, such as lead and aromatic hydrocarbons which in the conventional operation of an internal-combustion engine cause environment-polluting exhaust gases, is not necessary. On the other hand, operation according to this invention with a fuel that contains aromatic hydrocarbons is possible because the aromatic hydrocarbons can be decomposed into harmless components.

Operation directed toward cracked gas containing methane and carbon monoxide, and possibly hydrogen, means a substantial reduction of the environment-polluting nitrogen oxides such as $NO$, $N_2O_4$ and $NO_2$.

Gas reformers operating according to the method of this invention makes it possible to fuel motor vehicles from the existing network of filling stations. Since no anti-known agents need to be added to the fuel, the complexity of the refining plant is reduced.

As compared to a conventional carburator, the efficiency of the method of this invention is increased by the fact that a specific power reduction in displacement per cylinder is over-compensated by a reduction of the specific fuel consumption per work spent of the motor vehicle.

DETAILED DESCRIPTION OF THE PREFERRED EMBODIMENT

Method

Figure 1:
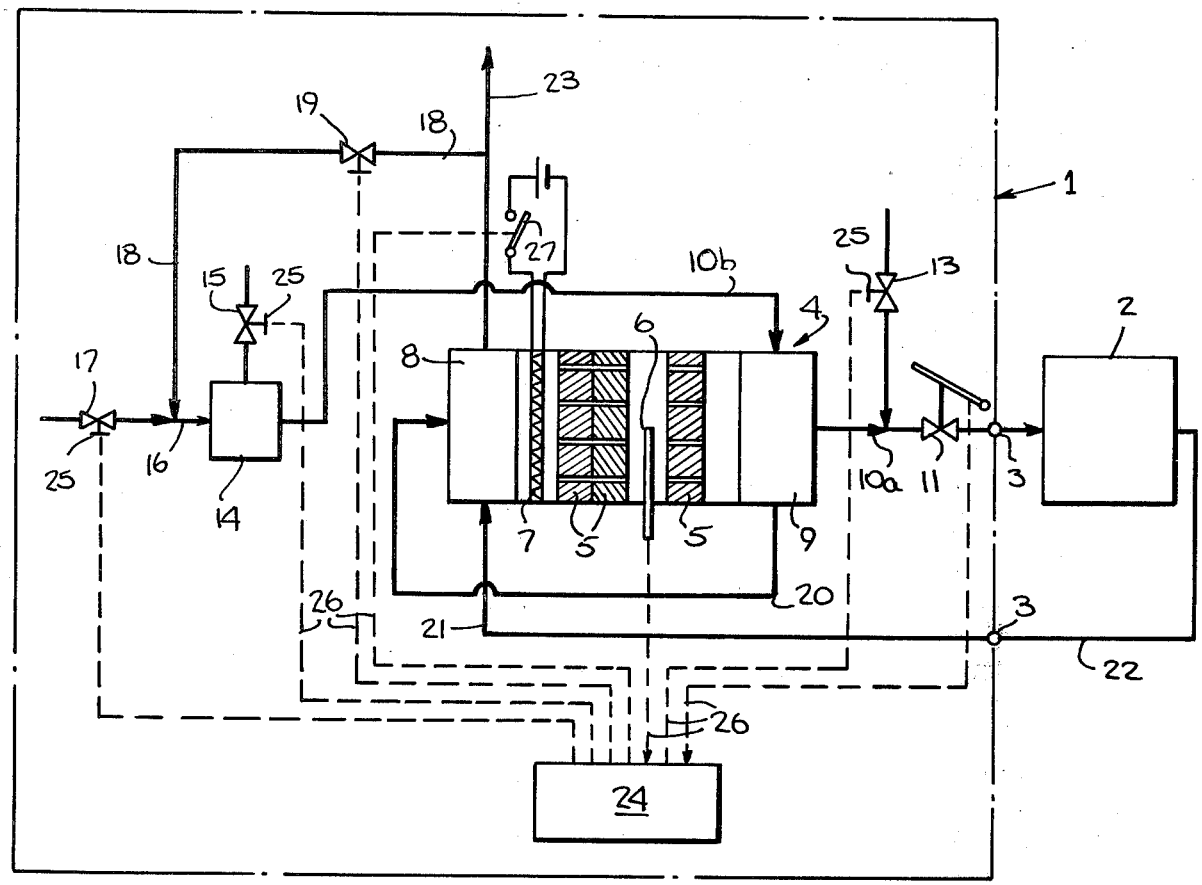
FIG. 1 is a schematic diagram of the gas reformer apparataus of this invention, as it is operated in conjunction with an internal-combustion engine.

The method of this invention for the operation of internal-combustion engines for the purpose of producing low-pollution exhaust gases comprises the following steps: supplying fuel and slightly understochiometric primary air to the reformer chamber of a gas reformer during the starting and warm-up of the internal-combustion engine; igniting the mixture of fuel and primary air in the gas reformer; maintaining the supply of slightly understochiometric primary air until the starting temperature of the catalyst is reached; reducing the proportion of primary air relative to the proportion of fuel after the starting temperature of the catalyst is reached until the reforming temperature for the fuel-exhaust gas mixture is reached; and replacing the primary air with exhaust gas and replacing part of the fuel with exhaust gas after the reforming temperature has been reached for the transition to operation of the internal-combustion engine under load, accompanied by a thermal exchange with the mixture fed to the catalyst thereby producing a rise in the catalyst temperature to a predetermined operating temperature of the catalyst.

To control the transition to operation under load simply and to achieve reliable low-pollution operation, the primary air is replaced by exhaust gas in the ratio of 1:1 and part of the fuel is replaced by exhaust gas by reducing the fuel by ⅓ for complete replacement of the primary air by exhaust gas. For partial replacement of the primary air by exhaust gas, the reduction in fuel is made proportional to the amount of primary air replaced.

If exhaust gas is replaced by primary air, the fuel supply must be increased and the increase in fuel should be proportional to the quantity of exhaust gas replaced.

For regulating the catalyst temperature during operation of the internal-combustion engine under load, the proportion of exhaust gas used is reduced and the proportion of primary air and fuel is increased, if the catalyst temperature is falling; and the proportion of exhaust gas used is increased and the proportion of primary air and fuel is reduced, if the catalyst temperature is rising.

In order to enable the gas reformer to reach normal operating temperature rapidly, upon starting the internal-combustion engine, the supply of secondary air is heavily throttled and the supply of secondary air during warm-up is increased as the supply of fuel is increased or as the supply of primary air is decreased. The combustion engine supplied with reformed gas can be loaded while the reformer is warming up, without noxiuos emissions appearing in the exhaust gas. Particularly rapid starting up of the internal-combustion engine is achieved if relatively more secondary air is added with increasing supply of fuel during the warm-up period.

For the purpose of regulating the temperature of the catalyst during operation of the internal-combustion engine under load, the supply of primary air may be increased with a corresponding stochiometric amount of fuel additionally supplied, if the temperature of the catalyst is falling; and the supply of primary air may be reduced with a reduced amount of fuel being added to the stochiometric quantity which corresponds to the reduction in primary air, if the temperature of the catalyst is arising. For the purpose of controlling the internal-combustion engine at will, the rate of gas flow may be increased in the flow direction behind the inlet for the secondary air and the proportion of fuel being added may be increased for the purpose of increasing the power output of the internal-combustion engine; and the rate of gas flow may be decreased and the proportion of fuel being added may be reduced for the purpose of decreasing the power output of the internal-combustion engine. As a result of such control of the internal-combustion engine during operation under load, rapid load changes become possible, the operating temperature at the catalyst is maintained constant within relatively narrow limits in a simple manner, and even in the event of rapid load changes reformed gas of essentially constant composition is generated.

During push operation, such as when the motor vehicle is being driven downhill, the production of low-pollution exhaust gases may be achieved in the following manner: the feedback of exhaust gases in the intake line feeding reformed gas to the internal-combustion engine is stopped at a predetermined value above the maximum underpressure which ordinarily occurs during a load change and quantities of primary air and fuel at the stochiometric ratio are supplied which are small in comparison to normal operation under load.

When effecting the changeover to increasing exhaust gas feedback between the reforming temperature and the operating temperature, one should select the temperature which is near the reforming temperature for a rapid increase of the catalyst temperature which corresponds to rapid acceleration from starting through warm-up of the internal-combustion engine. On the other hand, one should select the temperature near the operating temperature for a slow temperature rise in the catalyst temperature which corresponds to slow acceleration of the internal-combustion engine. This achieves counteraction for acceleration in the last phase and facilitates rapid settling at the operating temperature.

Under extreme operating conditions such as represented by idling and by push operation when the vehicle is being driven downhill, it may occur in operation under load that the temperature drops below the reforming temperature or a predetermined temperature above the operating temperature is exceeded, even though the countermeasures described previously have been taken. In this event, the exhaust gas feedback may be stopped and primary air and fuel may be supplied in a manner similar to the way in which primary air and fuel are supplied during warm-up of the internal-combustion engine. Fuel and primary air are thus fed to the catalyst in an appropriate manner understochiometrically.

It is particularly advantageous to effect a thermal exchange between the exhaust gas and the mixture being fed to the catalyst before the mixture is conducted to the catalyst and to effect a further thermal exchange between the reformed gas behind the catalyst and the mixture being fed to the catalyst before subjecting the mixture to a thermal exchange with the exhaust gas.

The gas reformer of this invention should be operated by a central control and regulating arrangement so that, from among the large number of parameters, those parameters are selected which make possible a simple control of the process.

The fuel used is a fuel containing carbon and hydrogen such as gasoline. It is converted at elevated temperature into soot-free reformed gas which contains methane, hydrogen and carbon monoxide.

Apparatus

FIG. 1 illustrates one embodiment of a gas reformer 1 for implementing the method of this invention. The gas reformer 1 is arranged for use in conjunction with an internal-combustion engine 2, such as that used in automobiles. The reformer 7 is coupled to the internal-combustion engine 2 at connection points 3. A mixture of fuel and primary air or fuel and exhaust gas or fuel and a combination of primary air and exhaust gas is supplied to a reformer chamber 4 for soot-free conversion into reformed gas. The reformed gas from the reformer chamber 4 is then conducted to the internal-combustion engine 2. One or more porous, perforated sintered blocks 5 having fine canals are located within the reformer chamber 4 and these sintered blocks act as a catalyst carrier. The catalyst which is carried by the perforated sintered blocks 5 will be described in more detail subsequently. The catalyst may also be referred to as the catalytic material or the catalyzer. A temperature sensor 6 is also located within the reformer chamber 4 for measuring the temperature of the catalyst. An ignition device 7 is arranged ahead of at least one sintered block 5 within the reformer chamber 4 for igniting the fuel-air or exhaust gas mixture.

A first heat exchanger 8 is located ahead of the ignition device 7 within the reformer chamber 4. The exhaust gases of the internal-combustion engine 2 are fed to the first heat exchanger 8. A second heat exchanger 9 is also located behind the ignition device 7 within the reformer chamber 4. The fuel-air and/or exhaust gas mixture enters the reformer chamber 4 at the second heat exchanger 9 and the reformed gas leaves the reformer chamber 4 from the second heat exchanger 9. A reformed gas pipeline 10a is arranged between the second heat exchanger 9 and the internal combustion engine 2 for the purpose of conducting the reformed gas from the reformer chamber 4 to the internal-combustion engine 2.

A control throttle load valve 11 is located in the reformed gas pipeline 10a, between the second heat exchanger 9 and the internal-combustion engine 2. The control throttle load valve 11 is coupled to the gas pedal of the internal-combustion engine for the purpose of controlling the power output of the internal-combustion engine 2. A secondary air valve 13 and a secondary air line 12 are used for the purpose of adding secondary air to the reformed gas before the reformed gas reaches the internal-combustion engine 2. The secondary air line 12 is connected to the reformed gas pipeline 10a ahead of the controlled throttle load valve 11 between the second heat exchanger 9 and the internal-combustion engine 2.

Fuel is supplied to a fuel metering device 14 in which the fuel is mixed with primary air or exhaust gas or a combination of primary air and exhaust gas. A fuel valve 15 and a fuel pipeline are used for supplying the fuel to the fuel metering device 14 and for this reason the fuel pipeline is connected to the fuel metering device 14. A fuel mixture pipeline 10b is arranged between the fuel metering device 14 and the second heat exchanger 9 of the reformer chamber 4 for the purpose of conducting the fuel-air or exhaust gas mixture from the fuel metering device 14 to the second heat exchanger 9 of the reformer chamber 4. A primary air valve 17 and a primary air pipeline 16 are used for supplying the fuel metering device 14 with primary air and for this reason the primary air pipeline 16 is connected to the fuel metering device 14.

A system exhaust pipeline 23 is connected to the first heat exchanger 8 for the purpose of discharging exhaust gases which have been fed from the internal-combustion engine 2 to the first heat exchanger 8. An exhaust recirculation valve 19 and an exhaust recirculation pipeline 18 are arranged between the system exhaust pipeline 23 and the primary air line 16 for the purpose of recirculating part of a system exhaust from the system exhaust pipeline 23 to the primary air pipeline 16 and then into the fuel metering device 14. An internal combustion engine exhaust pipeline 21 and 22 is arranged between the internal-combustion engine 2 and the first heat exchanger 8 for the purpose of conducting exhaust from the internal-combustion engine 2 to the first heat exchanger 8. A heat exchanger pipeline 20 is arranged between the first heat exchanger 8 and the second heat exchanger 9. The heat exchangers 8 and 9 are thus connected with each other in two ways, through the reformer chamber 4 itself and through the heat exchanger pipeline 20.

A central control and regulating unit 24 has control leads 26 connected to the primary air valve 17, to the exhaust recirculation valve 19, to the fuel valve 15 which controls the fuel leading to the fuel metering device 14, to the secondary air valve 13, to the control throttle load valve 11, to the ignition device 7 through switch 27, to the temperature sensor 6 and to other points in the reformer chamber. The central control and regulating unit 24 may be of simple design using well-known electronic means.

It is advantageous and facilitates the design of a simple central control and regulating unit 24 if the various valves are arranged in the following manner: the primary air valve 17 is open in the rest position; the exhaust recirculation valve 19 is closed in the rest position; the secondary air valve is throttled in the rest position; and control throttle load valve 11 is throttled in the rest position; and the fuel valve 15 and the fuel metering device 14 for the fuel supply are in their operative positions. Positioning means 25 are arranged at the respective valves.

Optionally, an additional valve, not shown, may be arranged in the system exhaust pipeline 23 and this additional valve is coupled to the exhaust recirculation valve 19 so that the additional valve changes to the throttled position if the exhaust recirculation valve 19 opens and the additional valve opnes if the exhaust recirculation valve 19 is closed.

If the ignition device 7 is provided with hot wires which are coated with catalytic material, the generation of reformed gas is intensified in the starting phase, so that the internal-combustion engine 2 can be loaded during the first phase of starting up the gas reformer 1. It is also possible to switch a perforated sintered block, instead of a hot wire or grid, directly in the heater circuit of the ignition device 7, as metallic catalysts and even catalysts consisting of semiconductors are sufficiently conductive under the prevailing operating conditions. In this embodiment, the perforated sintered block is directly heated electrically.

An advantageous central control and regulating unit 24 for such a gas reformer 1 is designed so that the ignition device is switched on, dependent on the temperature measured at the catalyst in the range below the starting temperature, and the fuel metering device 14 is put in operation, adjusted to slightly understochiometric combustion. At the starting temperature the control unit 24 delivers a signal for opening the switch 27 of the ignition device 7. The control unit 24 is also designed by known means in such a manner that above the starting temperature up to the point where the reforming temperature is reached, the secondary air valve 13 is opened proportionally to the temperature of the catalyst in excess of the starting temperature, and the gasoline supply is increased. When the reforming temperature is reached, the exhaust recirculation valve 19 is opened and switched to "control", whereafter the temperature measured at the catalyst serves as the control for the supply of the primary air and the fuel, and possibly, the recirculation of the system exhaust. Superimposed is a control of the fuel metering device as a function of the opening of the control throttle load valve 11. In an alternate embodiment of this invention, means are provided which open the secondary air valve 13 proportionally to the temperature of the catalyst in excess of the starting temperature and which throttle the primary air valve 17 proportionately to the temperature of the catalyst in excess of the starting temperature.

As a result of the operation of the central control and regulating unit: The ignition device 7 is switched on as a result of the temperature measured at the catalyst when the temperature is in the range below the starting temperature of the catalyst. The fuel metering device 14 is placed in operation in a condition adjusted to slightly understsochiometric combustion also as a result of a temperature measured at the catalyst when the temperature is in the range below the starting temperature of the catalyst. The ignition device 7 is turned off at the starting temperature of the catalyst. The secondary air valve 13 is opened above the starting temperature of the catalyst and remains open until the temperature reaches the reforming temperature and the opening of the secondary air valve 13 is proportional to the temperature in excess of the starting temperature. The supply of fuel is increased. The exhaust recirculation valve 19 is opened to increase the feedback of exhaust gas. The temperature measured at the catalyst serves as a control for the supply of primary air and fuel and also affects the fuel metering device 14 depending upon the opening of the control throttle load valve 11. If the internal-combustion engine 2 is not to be controlled at will as to power output, as it is in the case of a motor vehicle engine during operation under load, the control throttle load valve 11 can be omitted.

Operation

For starting, in the case of an automobile engine by turing on the ignition switch, fuel by means of the fuel valve 15 and primary air at a slightly understochiometric rate, relative to complete combustion, are fed to the fuel metering device 14. They are mixed there and conducted to the reformer chamber 4, through the two heat exchangers 9 and 8, and ignited by the ignition device 7. The combustion process heats the perforated sintered blocks 5 in reformer chamber 4 and forms a small amount of reformed gas which is fed, with the correspondingly small quantity of secondary air, to the internal-combustion engine 2 for combustion, whereby the engine can be kept idling. The starter, which allowed the combustion mixture to be drawn in initially through the internal-combustion engine 2, can therefore be turned off. The exhaust gases of the internal-combustion engine 2 are fed through the first heat exchanger 8 to the system exhaust pipeline 23. The slightly understochiometric supply of the primary air is maintained until the starting temperature of the catalyst, with which the perforated sintered blocks 5 are provided, is reached. The term, "starting temperature" means that temperature at which the action of the catalyst leads to an appreciable reaction.

For the heating up of the gas reformer chamber 4, the share of the air in the mixture is then reduced until the reforming temperature for a fuel-exhaust gas mixture using a fuel which contains carbon and hydrogen is reached. According to the customary chemical terminology, the term, "reforming temperature" means that temperature at which methane, carbon monoxide and possibly, hydrogen are obtained from a mixture of fuel and exhaust gas of the internal-combustion engine, which contains, among other substances, water vapor and carbon dioxide. More reformed gas is continuously supplied to the internal-combustion engine 2, which, when mixed with secondary air, is available for combustion in the internal-combustion engine 2. In warming up, the secondary-air valve 13, which is initially heavily throttled, is opened increasingly wider with increasing supply of fuel or decreasing supply of primary air, respectively, so that relatively more secondary air is added to the reformed gas behind the reformer chamber 4.

If the primary air is reduced for reducing the share of the air in the mixture, the heating up in the reformer chamber 4 is slowed down so that a "soft" transition to the operating temperature above the reforming temperature is achieved without further control actions. In contrast, the system is brought up particularly fast if the supply of fuel is increased. If there are delays in the system, which are determined particularly by the length of the exhaust pipeline 21 and 22 between the internal-combustion engine 2 and the heat exchangers 8 and 9, the pipe diameter as well as by the size of the heat exchangers 8 and 9, the temperature then first rises above the operating temperature and then approaches the nominal operating temperature as a damped oscillation.

For the transition to operation under load, primary air and part of the fuel are replaced by exhaust gas, from reaching the reforming temperature on, while the mixture fed to the catalyst is conducted through the heat exchanger connected into the exhaust stream, in such a manner that the temperature of the catalyst rises to a predetermined operating temperature and settles there. To this end, primary air, for instance, is increasingly interchanged with exhaust gas in the ratio 1:1. The fuel is reduced here proportionally to the interchanged quantity of air by ⅓. If for instance, initially 12 m³ of primary air and 3 kg of gasoline were fed in per hour, and exhaust gas was fed in at an increasing rate up to 6 m³ of exhaust gas and the remaining 6 m³ as air, the fuel must be reduced by ⅓ of ½, i.e., by 1/6. Thus, ultimately only 3 (kg) − 3 (kg) . 1/6 = 3 − 0.5 (kg) = 2.5 (kg) of fuel have to be supplied.

For controlling the operation under load, the operating temperature of the catalyst can then be maintained with approximately constant reform gas generation, by additionally feeding in, with decreasing temperature, primary air with a corresponding stochiometric amount of fuel. With increasing temperature, one reduces the supply of primary air and the supply of fuel by a stochiometric quantity corresponding to the reduction of air.

Completely constant reform gas generation is obtained is one proceeds as follows with the control of the operation under load: For decreasing temperature of the catalyst the exhaust gas share is reduced and the share of the air as well as the fuel is increased. The exhaust gas is advantageously interchanged here in the ratio 1:1 with primary air and the fuel is proportionally increased so that it is reduced by ⅓ relative to air operation, referred to complete replacement of the primary air by exhaust gas. For increasing temperature, one proceeds conversely in an analogous manner.

In order to control the internal-combustion engine 2 at will, the reformed gas flow rate is increased behind the feed point of the secondary air in the flow direction, for increasing the power output, for instance, by opening the control throttle load valve 11 wider by means of a gas pedal. The fuel metering device 14 is designed in a conventional manner either so that with increased supply of reformed gas the fuel supply is increased, or that, as in the example of the embodiment, the feeding of the fuel is controlled through the central unit 24 in such a manner that with increased reformed gas relatively more fuel is added. For cutting down the power of the internal-combustion engine, the supply of reformed gas is throttled by means of the control throttle load valve 11 and relatively less fuel is supplied.

The second heat exchanger 9 following the reformer chamber 4 cools the reformed vaporous or gaseous fuel, so that self-ignition upon the addition of secondary air and engine knock is avoided, and the degree of admission of the cylinders of the internal-combustion engine 2 increases, which has the effect of increasing the power output. This second heat exchanger 9 contributes at the same time to the heating of the fuel mixture fed to the reformer chamber 4. Through the particular arrangement and connection of the heat exchangers according to the embodiment shown in FIG. 1 a larger thermal feedback is made possible than with the customary series connection of two heat exchangers.

The control and regulating unit 24 is designed with ordinary means for switching on the ignition device 7 in dependence on the temperature measured at the catalyst by means of the temperature sensor 6 in the range below the starting temperature, and for putting in operation the fuel metering device 14 according to slightly understochiometric combustion. At the starting temperature a signal is transmitted to disconnect the ignition device 7 above the starting temperature up to reaching the reforming temperature. The temperature in excess of the starting temperature is the governing factor. The secondary-air valve is opened proportionally to this temperature difference and the fuel supply is increased. When the reforming temperature is reachhed, the signal is transmitted to open the exhaust gas valve gradually, and at the same time a switch to "control" is made automatically, the measuring temperature serving as the control quantity for the supply of the primary air, the supply of fuel and the feedback of exhaust gas. Means for a simultaneously superimposed control may be provided which effect a control of the fuel metering device 14 as a function of the opening of the control throttle load valve 11. Such means are unnecessary if in lieu of a metering device with injection pump a metering device is used, which draws in fuel in dependence on the gas throughout. Rapid start-up of the system is achieved by means of the control and regulating system described. For this alternate embodiment with particularly gradual transition of the temperature to the operating temperature, the control unit 24 must be modified so that, although the secondary air valve 13 is opened in proportion to the temperature in excess of the starting temperature, the primary air valve 17 is proportionally throttled.

Figure 3:
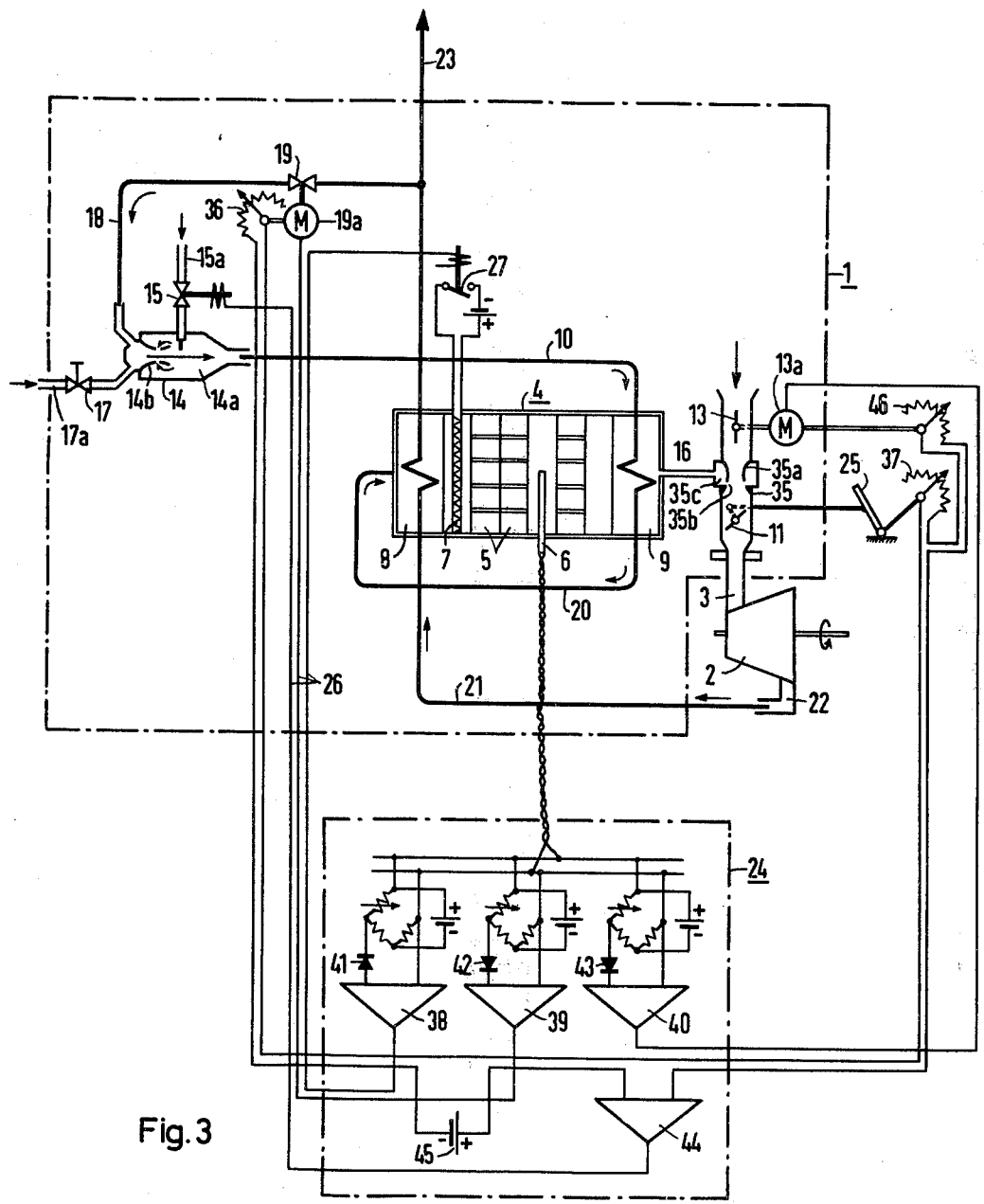
FIG. 3 shows a more detailed embodiment of the gas reformer apparatus of FIG. 1.

FIG. 3 illustrates a more detailed embodiment of the apparatus of FIG. 1. In FIG. 3, parts identical to those in FIG. 1 are given identical reference numerals. As illustrated, the fuel metering device 14 is formed using a mixing chamber 14b, into which opens a venturi like valve 14b. The primary air inlet line is designated 17a and the exhaust gas inlet as 18. These are connected in the chamber of the member 14b as shown. The primary air valve controls the amount of air and the exhaust valve 19 controls, in a manner to be described below, the amount or proportion of exhaust gas provided into the chamber 14b. The input to the exhaust control valve 19 is taken from the exhaust pipe 23 as indicated. In addition to the primary air input through the valve 17 and the exhaust input through the valve 19, a magnetically controlled valve 15 opens into the mixing chamber 14a. This valve has connected to its input a gasoline supply line 15a. Operation of this valve admits gasoline to the mixing chamber where it will be mixed with the primary air and exhaust gas. The outlet of the fuel metering device 14 is connected using a pipe 10 through a heat exchanger 9, where it is heated by the reformed gas and benced through the heat exchanger 8 where it is additionally heated by the exhaust gases flowing therethrough to the exhaust pipe 23. The mixing chamber 14 has a plurality of perforations in its path at its narrowest point through which the mixture is sucked into the primary air or exhaust stream for better mixing. At the connection 3 to the internal combustion engine 2, a gas-air mixer or carburetor 35 is placed which comprises venturi valve-like recesses 35a. Positioned at the recess 35a are perforations 35b which lead to chambers 35c having pipes 16 leading thereto from the exit chamber of the reformed gas generator 4. Secondary air is sucked into the combustion engine 2 after passing a choke valve 13 placed before the recess 35a and a load or throttle valve 11 placed after the recess 35a. During this process, the secondary air is mixed with the reformed gas which is sucked in through the opening 35b.

The valve 19 which provides exhaust gas to the mixing chamber 14 has associated therewith a servo motor 19a which is coupled in conventional fashion through reduction gearing to the regulating unit of the exhaust valve 19 and also to the wiper of a potentiometer 36. In similar fashion, the choke valve 13 is geared to a servo motor 13a which also has coupled to it a potentiometer 46. The gas pedal 25 which is coupled mechanically to the load valve 11 has attached thereto a follow-up potentiometer 37.

A temperature sensor 6 which may be a temperature dependent resistor such as a thermistor is disposed in the reformed gas generator 4 and provides inputs to the regulating arrangement 24. This arrangement includes three regulating amplifiers 38, 39 and 40. The output of the amplifier 38 is coupled to the excitation coil of a relay 27. The output of the regulating amplifier 39 is coupled to the servo motor 19a and the output of the regulating amplifier 40 is coupled to servo motor 13a. The inputs for each of the amplifiers 38, 39 and 40 are connected across the diagonal of respective Wheatstone bridges. Each bridge includes two fixed resistor brances, a variable resistor and has as its fourth resistance branch the resistance of the temperature dependent resistor 6. Each of the bridges has across its other diagonal a battery or other source of D-C potential. One input to each of the amplifiers 38, 39 and 40 is coupled through a diode, respectively diodes 41, 42 and 43. The adjustable resistors and thermistor 6 are provided in opposite arms of the bridge, thus, permitting the adjustable resistor to be used for initial bridge balancing at a desired temperature.

Also included in the regulating arrangement 24 is a fourth amplifier 44 having its output coupled to the excitation coil of the magnetic valve 15. The inputs of amplifier 44 are connected to the series circuit comprising the potentiometers 36, 37 and 46 and a D-C source or battery 45.

At the start of operation of the arrangement of FIG. 3, the primary air valve 17 is in an open position. During start-up, diode 41 is forward biased and diodes 42 and 43 back biased by their respective bridge outputs. This results in an input to the amplifier 38 which will energize the relay coil of relay 27 causing its contact to close and apply a voltage to the ignition device 7. Ignition device 7 is thus heated. When the gas reformer 4 comes up to its starting temperature $T_A$, the output of the temperature sensitive resistor 6 will cause a voltage in the bridges such that the diode 41 is back biased and the diode 43 becomes forward biased with diode 42 remaining back biased. As a result, the relay 27 is deenergized and ignition device 7 switched off. In response to an output from amplifier 40 which now has an input through diode 43, the choke valve 13 for the secondary air is slowly opened in proportion to the difference between the temperature of the gas reformer and the starting temperature. That is, beginning at the starting temperature, the temperature sensitive resistance, as temperature rises, in the bridge associated with amplifier 40 will cause an increasing voltage to appear at the input of amplifier 40. This increasing voltage in turn will cause the motor 13a to gradually open the choke valve 13. As this valve 13 is opened, an indication thereof will fe fed back by the potentiometer 46 into the amplifier 44. Its output will then cause the magnet valve 15 to increase the supply of gasoline into the mixing chamber 14. When the gas reformer 4 finally reaches the reform temperature $T_R$ for the gasoline exhaust gas mixture, the output of the bridge associated with amplifier 39 will be such as to forward bias the diode 42 resulting in an output from amplifier 39 which will drive the motor 19a to open the exhaust valve 19 to cause a portion of exhaust gas to be supplied to the mixing chamber 14. In conjunction with this opening, the follow-up potentiometer 36 will be adjusted feeding back a signal to the amplifier 44 which will cause the supply of gasoline to be reduced through a partial closing of the magnetic valve 15. Operation of the gas pedal 25 will result in the load valve 11 being open to provide increased amounts of the reformed gas air mixture into the internal combustion engine 2. As the gas pedal is depressed, follow-up potentiameter 37 will provide a signal to amplifier 44 which will cause the magnetic valve 15 to be opened more to permit a greater total amount of gasoline into the reformed gas generator.

Thus, the ignition device 7 is controlled by the amplifier 38 which maintains it on until the starting temperature $T_A$ is reached. The choke valve 13 is controlled by the amplifier 40 to open the choke valve as the temperature increases between the starting temperature $T_A$ up to the temperature $T_R$ where it will be fully opened. The amplifier 39 begins operating at the temperature $T_R$ to open the exhaust valve 19 to allow increasing amounts of exhaust gas into the mixing chamber 14 as temperature increases. Through the follow-up potentiometers 36, 37 and 46, the amount of fuel provided to the mixing chamber is controlled by the magnetic valve 15 as a function of the amount of exhaust gas being supplied to the mixing chamber, the amount of depression of the gas pedal, and the amount of opening of the choke valve 13. Naturally, should the temperature decrease, operation in the opposite sequence will occur. That is, as the temperature drops down, the exhaust valve 19 will be gradually closed until at the temperature $T_R$ it is fully closed. Such closing will permit more air into the mixing chamber to result in an increase in the temperature at which time the exhaust valve 19 will again open. As the exhaust valve opens, the fuel supply is decreased with the exhaust gas replacing a portion of the fuel as described above. Should the temperature fall, and the exhaust valve start to close, the amount of fuel is automatically increased.

In the embodiment of FIG. 3 the control lead 26 from the central control and regulating unit 24 to the air valve 17 is not illustrated. It will be recognized by those skilled in the art that in view of the fact that controls are provided for the exhaust valve 19 and the fuel valve 15 the required mixture of air, fuel and exhaust can be obtained without the need to control the valve 17. However, should such control be desired it will be equally well recognized that such control can be accomplished in the same manner as the control of the valve 19 is carried out. That is to say, an additional amplifier such as the amplifier 39 can be provided along with an additional motor and follow up potentiometer.

Example

The invention will be illustrated further with the aid of the following example:

With a perforated sintered block of $Al_2O_3$ as the catalyst carrier and platinum as the catalyst, and with about 5 mg of platinum per 1 $cm^2$ of carrier material, one obtains a starting temperature of 120°C., a reforming temperature at about 420°C., and the operating temperature adjusts itself at about 480°C. The catalyst carrier mentioned must be made of aluminum oxide in pure form, for instance, as a perforated sintered block. Such a catalyst carrier can be stressed with up to 800°C. without reduction of the useful life.

The perforated sintered blocks are built up so that a multiplicity of parallel gas canals are produced which have naturally porous surfaces. The pore volume of the sintered blocks is 20 to 60%, preferably 40 to 50%. The passage openings, in the form of holes perpendicular to the surface, are in the range of 0.1 to 2 mm. The number of the passage openings per cm² depends on the diameter of the holes. When the holes are about 1mm in diameter, 1 cm² of perforated sintered block surface perpendicular to the gas canals has about 40 holes. In a reformer chamber with inside dimensions of about 80 mm × 80 mm × 215 mm, the catalyst carrier is arranged in the embodiment shown in FIG. 1 in the form of three perforated sintered blocks placed parallel to each other, which are 15 mm thick each and have a mutual spacing of 5 mm.

If an internal-combustion engine, upon operation of the starter, draws in about 10 m³ of primary air per kg of $C_8H_{16}$, which corresponds to 50 mol of air per mol of $C_8H_{16}$ fuel, the ignition device must be operated, for instance, for 10 seconds until the starting temperature of 120°C. is reached.

During warming up, the air-fuel ratio, for instance, of 10 m³ of primary air per kg of $C_8H_{16}$ fuel is changed down to 4 m³ of air per kg of fuel by reducing the air, 20 mol of air are then used approximately per mol of fuel. The following reaction then takes place in the reformer chamber:

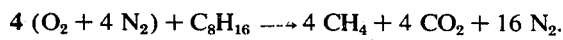
$$4(O_2 + 4 N_2) + C_8H_{16} \longrightarrow 4 CH_4 + 4 CO_2 + 16 N_2.$$

In the internal-combustion engine, the following reaction then takes place if secondary air is added:

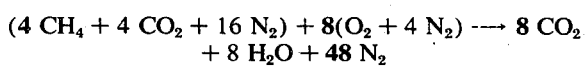
$$(4 CH_4 + 4 CO_2 + 16 N_2) + 8(O_2 + 4 N_2) \longrightarrow 8 CO_2 + 8 H_2O + 48 N_2$$

If one replaces, for changing to operation under load, the primary air increasingly by exhaust gas until the temperature of the catalyst begins to fall in the direction toward the operation temperature, and if one then increases the share of the primary air again for settling to the operating temperature, the following reaction takes place in the reformer chamber:

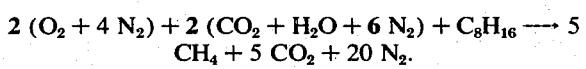
$$2(O_2 + 4 N_2) + 2(CO_2 + H_2O + 6 N_2) + C_8H_{16} \longrightarrow 5 CH_4 + 5 CO_2 + 20 N_2.$$

In the internal-combustion engine the following combustion reaction then takes place:

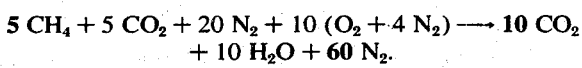
$$5 CH_4 + 5 CO_2 + 20 N_2 + 10(O_2 + 4 N_2) \longrightarrow 10 CO_2 + 10 H_2O + 60 N_2.$$

Figure 2:
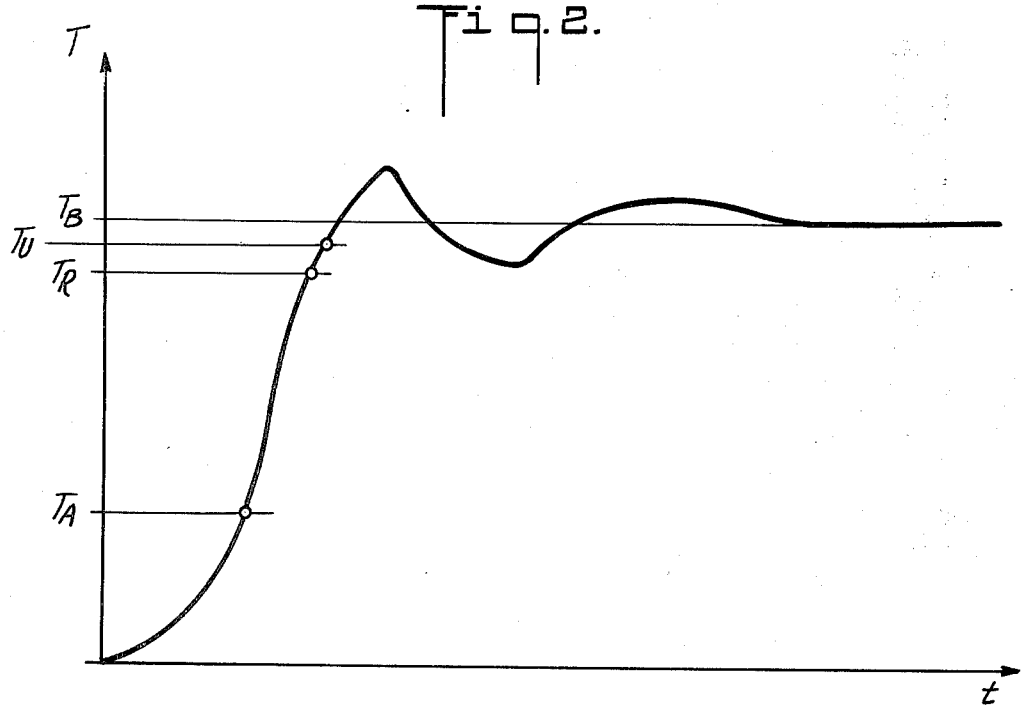
FIG. 2 is a graph in which the temperature in the vicinity of the catalyst is plotted on the ordinate and the time is plotted on the abscissa to show the temperature pattern for increasing fuel supply during warm-up.

Referring to FIG. 2, the temperature T which is measured in the vicinity of the catalyst, the catalyst temperature, is plotted on the ordinate, and the time $t$ on the abscissa. The curve shown indicates roughly and schematically the temperature pattern for increasing fuel supply during warm-up. $T_A$ designates the starting temperature, $T_R$ designates the reforming temperature, $T_B$ designates the operating temmperature, and $T_{t'}$ designates the temperature at which the exhaust gas is fed back. The course of the temperature above $T_A$ does not rise linearly. This is essentially related to the fact that in the reformer chamber 4 the energy consumption for heating up and that for the fuel conversion act as two heat sinks connected in parallel. For this reason, the heating power is decreased with an increased supply of fuel, with rising temperatures.

In the foregoing specification, the invention has been described in reference to a specific exemplary embodiment and method. It will be evident, however, that variations and modifications in the embodiment and method explained by way of illustration may be made without departing from the broader scope and spirit of the invention as set forth in the appended claims. The specification and drawings are accordingly to be regarded in an illustrative rather than in a restrictive sense.

What is claimed is:

1. Method for the operation of internal-combustion engines having a gas reformer, reformer chamber and a catalyst for the purpose of reducing the pollution of exhaust gases, comprising:
   a. supplying a mixture of fuel and slightly understochiometric primary air to the reformer chamber of a gas reformer during the starting and warm-up of the internal-combustion engine;
   b. igniting the mixture of fuel and primary air in the gas reformer;
   c. maintaining the supply of slightly under-stochiometric primary air until the starting temperature of the catalyst is reached;
   d. reducing the proportion of primary air relative to the proportion of fuel after the starting temperature of the catalyst is reached until the reforming temperature for the fuel-exhaust gas mixture is reached; and
   e. replacing the primary air with exhaust gas and replacing part of the fuel with exhaust gas after the reforming temperature has been reached for the transition to operation of the internal combustion engine under load, accompanied by a thermal exchange with the mixture fed to the catalyst and producing a rise in the catalyst temperature to a predetermined operating temperature of the catalyst.

2. Method according to claim 1 wherein primary air is replaced by exhaust gas in the ratio of 1:1 and part of the fuel is replaced by exhaust gas by reducing the fuel by ⅓ for complete replacement of the primary air by exhaust gas and for partial replacement of primary air by exhaust gas the reduction of fuel is proportional to the amount of primary air replaced.

3. Method according to claim 2 wherein the fuel supply is increased if exhaust gas is replaced by primary air and the increase in fuel is proportional to the quantity of exhaust gas replaced.

4. Method according to claim 1 and further comprising the additional step of regulating the catalyst temperature during operation of the internal-combustion engine under load by:
   a. reducing the proportion of exhaust gas used and increasing the proportion of primary air and fuel, if the catalyst temperature is falling; and
   b. increasing the proportion of exhaust gas used and reducing the proportion of primary air and fuel, if the catalyst temperature is rising.

5. Method according to claim 1 and further comprising the additional step of heavily throttling the supply of secondary air upon starting the internal-combustion engine and increasing the supply of secondary air during warm-up as the supply of fuel is increased in order to enable the gas reformer to reach normal operating temperature rapidly.

6. Method according to claim 1 and further comprising the step of heavily throttling the supply of air during the starting of the internal-combustion engine and increasing the supply of secondary air during warm-up as the supply of primary air is decreased.

7. Method according to claim 1 and further comprising the additional step of regulating the temperature of the catalyst during operation of the internal-combustion engine under load by:
   a. increasing the supply of primary air with a corresponding stochiometric amount of fuel additionally supplied, if the temperature of the catalyst is falling; and
   b. reducing the supply of primary air and reducing the amount of fuel being added by a stochiometric quantity which corresponds to the reduction in the primary air.

8. Method according to claim 1 and further comprising the additional step during push operation of stopping the feedback of exhaust gas in the intake line feeding reformed gas to the internal-combustion engine at a predetermined value above the maximum underpressure which ordinarily occurs during a load change and supplying quantities of primary air and fuel at the stochiometric ratio which are small in comparison to normal operation under load.

9. Method according to claim 1 and further comprising the additional step of effecting the change-over to increasing exhaust gas feedback between the reforming temperature and the operating temperature by selecting a temperature which is near the reforming temperature for a rapid increase of the catalyst temperature which corresponds to rapid acceleration from starting through warm-up of the internal-combustion engine and by selecting a temperature near the operating temperature for a slow temperature rise in the catalyst temperature which corresponds to slow acceleration of the internal-combustion engine.

10. Method according to claim 1 and further comprising the additional step of stopping the exhaust gas feedback if the temperature drops below the reforming temperature or if a predetermined temperature above the operating temperature is exceeded in extreme operating conditions and supplying primary air and fuel in a manner similar to the way in which the primary air and fuel are supplied during warm-up of the internal combustion engine.

11. Method according to claim 1 and further comprising the additional step of:
   a. increasing the rate of gas flow in the flow direction behind the inlet for the secondary air and increasing the proportion of fuel being added for the purpose of increasing the power output of the internal-combustion engine; and
   b. decreasing the rate of gas flow and reducing the proportion of fuel being added for the purpose of decreasing the power output of the internal-combustion engine.

12. Method according to claim 1 and further comprising the additional step of:
   a. effecting a thermal exchange between the exhaust gas and the mixture being fed to the catalyst to be carried out before the mixture is conducted to the catalyst; and
   b. effecting a further thermal exchange between the reformed gas behind the catalyst and the mixture being fed to the catalyst to be carried out before subjecting the mixture to a thermal exchange with the exhaust gas.

13. A gas reformer for use with an internal-combustion engine for the purpose of reducing the pollution of exhaust gases during operation of the internal-combustion engine, comprising:
   a. a reformer chamber to which a mixture of fuel and primary air or exhaust gas is supplied for soot-free conversion into reformed gas which is then conducted to the internal-combustion engine;
   b. one or more perforated sintered blocks located within the reformer chamber, said sintered blocks acting as a catalyst carrier;
   c. a catalyst which is carried by the perforated sintered blocks;
   d. a temperature sensor located within the reformer chamber for measuring the temperature of the catalyst;
   e. an ignition device arranged ahead of at least one sintered block within the reformer chamber for igniting the fuel-air and/or exhaust gas mixture;
   f. a first heat exchanger located ahead of the ignition device within the reformer chamber, to which first heat exchanger the exhaust gases of the internal-combustion engine are fed;
   g. a second heat exchanger located behind the ignition device within the reformer chamber at which second heat exchanger the fuel-air and/or exhaust gas mixture enters the reformer chamber and from which second heat exchanger the reformed gas leaves the reformer chamber;
   h. a reformed gas pipeline arranged between the second heat exchanger and the internal-combustion engine for conducting the reformed gas from the reformer chamber to the internal-combustion engine;
   i. a control throttle load valve located in the reformed gas pipeline, said valve being coupled to the gas peddle of the internal-combustion engine for controlling the power output of the internal-combustion engine;
   j. a secondary air valve and a secondary air line, said secondary air line being connected to the reformed gas pipeline ahead of the controlled throttle load valve for the purpose of adding secondary air to the reformed gas before the reformed gas reaches the internal-combustion engine;
   k. a fuel metering device to which fuel is supplied, and in which fuel metering device the fuel is mixed with primary air or exhaust gas;
   l. a fuel valve and fuel pipeline for supplying fuel to the fuel metering device;
   m. a fuel mixture pipeline arranged between the fuel metering device and the second heat exchanger of the reformer chamber for conducting the fuel-air and/or exhaust gas mixture from the fuel metering device to the second heat exchanger of the reformer chamber;
   n. a primary air valve and a primary air pipeline, said primary air pipeline being connected to the fuel metering device for supplying the fuel metering device with primary air;

o. a system exhaust pipeline connected to the first heat exchanger for the purpose of discharging exhaust gases which have been fed from the internal-combustion engine to the first heat exchanger;

p. an exhaust recirculation valve and exhaust recirculation pipeline, said exhaust recirculation pipeline being arranged between the system exhaust pipeline and the primary air line for the purpose of recirculating part of the system exhaust from the system exhaust pipeline to the primary air pipeline and then into the fuel metering device;

q. an internal-combustion engine exhaust pipeline arranged between the internal combustion engine and the first heat exchanger for the purpose of conducting exhaust from the internal-combustion engine to the first heat exchanger; and r. a heat exchanger pipeline arranged between the first heat exchanger and the second heat exchanger, whereby the heat exchangers are connected with each other in two ways, through the reformer chamber itself and through said heat exchanger pipeline.

14. The gas reformer according to claim 13 wherein the ignition device has hot wires which are coated with the catalytic material.

15. The gas reformer according to claim 13 wherein the ignition device has a heater circuit and a perforated sintered block has been switched into said heater circuit of the ignition device.

16. The gas reformer according to claim 13 and further comprising a central control and regulating unit having control leads connected to the primary air valve, to the exhaust recirculation valve, to the fuel valve, to the secondary air valve, to the control throttle load valve, to a switch for the ignition device and, to the temperature sensor.

17. The gas reformer according to claim 13 wherein the primary air valve is open in the rest position.

18. The gas reformer according to claim 13 wherein the exhaust recirculation valve is closed in the rest position.

19. The gas reformer according to claim 13 wherein the secondary air valve is throttled in the rest position.

20. The gas reformer according to claim 13 wherein the control throttle load valve is throttled in the rest position.

21. The gas reformer according to claim 16 wherein as a result of the operation of the central control and regulating unit:

a. the ignition device is switched on as a result of the temperature measured at the catalyst when the temperature is in the range below the starting temperature of the catalyst;

b. the fuel metering device is placed in operation in a condition adjusted to slightly understochiometric combustion also as a result of a temperature measured at the catalyst when the temperature is in the range below the starting temperature of the catalyst;

c. the ignition device is turned off at the starting temperature of the catalyst;

d. the secondary air valve is opened above the starting temperature of the catalyst and remains open until the temperature reaches the reforming temperature and the opening of the secondary air valve is proportional to the temperature in excess of the starting temperature;

e. the supply of fuel is increased;

f. the exhaust recirculation valve is opened to increase the feedback of exhaust gas; and g. the temperature measured at the catalyst serves as a control for the supply of primary air and fuel and also effects the fuel metering device depending upon the opening of the control throttle load valve.

22. The gas reformer according to claim 21 wherein the control and regulating unit opens the secondary air valve proportionally to the temperature of the catalyst in excess of the starting temperature.

23. The gas reformer according to claim 21 wherein the control and regulating unit throttles the primary air valve proportionally to the temperature of the catalyst in excess of the starting temperature.

* * * * *